United States Patent [19]

Abuyama

[11] Patent Number: 4,743,963
[45] Date of Patent: May 10, 1988

[54] APPARATUS FOR MAGNIFYING OR REDUCING A COLOR IMAGE IN WHICH SEQUENTIALLY-STORED RGB DATA ARE SELECTIVELY READ OUT FROM A MEMORY IN ACCORDANCE WITH PREVIOUSLY-DETERMINED READ CONTROL DATA

[75] Inventor: Yasuo Abuyama, Ebina, Japan

[73] Assignee: Kabushiki Kaisha Toshiba, Kawasaki, Japan

[21] Appl. No.: 855,705

[22] Filed: Apr. 25, 1986

[30] Foreign Application Priority Data

Apr. 30, 1985 [JP] Japan .................................. 60-93142

[51] Int. Cl.⁴ ........................ H04N 1/393; H04N 1/46
[52] U.S. Cl. ........................................ 358/77; 358/78; 358/287
[58] Field of Search ...................... 358/75, 76, 77, 78, 358/80, 287

[56] References Cited

U.S. PATENT DOCUMENTS

| | | | |
|---|---|---|---|
| 4,275,450 | 6/1981 | Potter | 358/77 |
| 4,412,252 | 10/1983 | Moore et al. | 358/77 |
| 4,454,537 | 6/1984 | Okada et al. | 358/77 |
| 4,564,865 | 1/1986 | Yamada | 358/287 |
| 4,589,035 | 5/1986 | Yamanishi et al. | 358/75 |
| 4,605,957 | 8/1986 | Yamada | 358/77 |
| 4,636,869 | 1/1987 | Tomohisa et al. | 358/77 |

FOREIGN PATENT DOCUMENTS 3318127 11/1983 Fed. Rep. of Germany.
3426531 2/1985 Fed. Rep. of Germany.

Primary Examiner—James J. Groody
Assistant Examiner—Randall S. Svihla
Attorney, Agent, or Firm—Schwartz, Jeffery, Schwaab, Mack, Blumenthal & Evans

[57] ABSTRACT

In a color picture image forming apparatus wherein manuscript picture image data read optically is decomposed into color signals of a plurality of types, the color decomposed picture image data is temporarily stored in a memory device, and a picture image recording device is driven by the stored picture image data for reproducing on a copying paper a color picture image corresponding to a manuscript picture image, at the time of enlarging or reducing the size of the picture image, a read address signal of the memory device corresponding to a set magnification or reduction degree is formed, and the read address signal thus formed is supplied to the memory device thereby enlarging or reducing the size of the reproduced color picture image. The color data, which may be RGB data, is stored sequentially in the memory means and is selectively read out in accordance with previously-determined read control data determined on the basis of the set magnification or reduction degree. Some of the color data may be read out more than once when the image is to be magnified, while some of the color data may be skipped when the image is to be reduced.

11 Claims, 16 Drawing Sheets

PHOTOELECTRIC CONVERTER SIDE    (R)  (G)  (B)  (R)  (G)  (B)  (R)

|←— IP —→|

THERMAL HEAD SIDE    ( )    ( )         ( )

|←————— OP —————→|

| ADDRESS IN RAM | 0 | 1 | 2 | 3 | 4 | 5 | 6 | 7 | --- | n | n+1 | n+2 | n+3 | ------- | 255 |
|---|---|---|---|---|---|---|---|---|---|---|---|---|---|---|---|
| RD | 1 | 1 | 0 | X | 1 | 1 | 1 | X | --- | 1 | 1 | 0 | X | ------- | X |
| ADR | 0 | | | | 4 | | | | --- | n | | | | ------- | |

X VACANT AREA

FIG.18
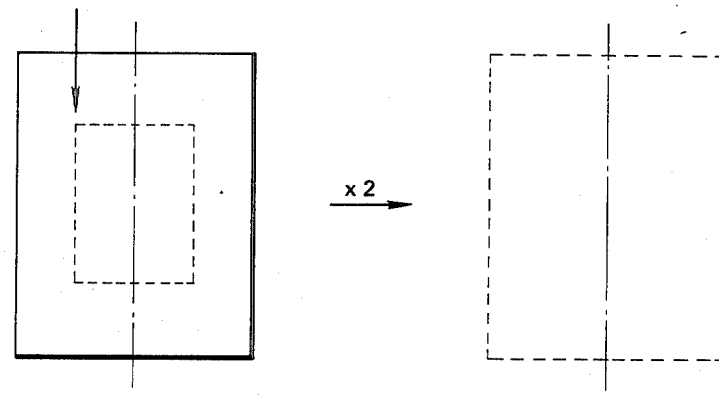
READ LEADING ADDRESS
×2
READ LEADING ADDRENS
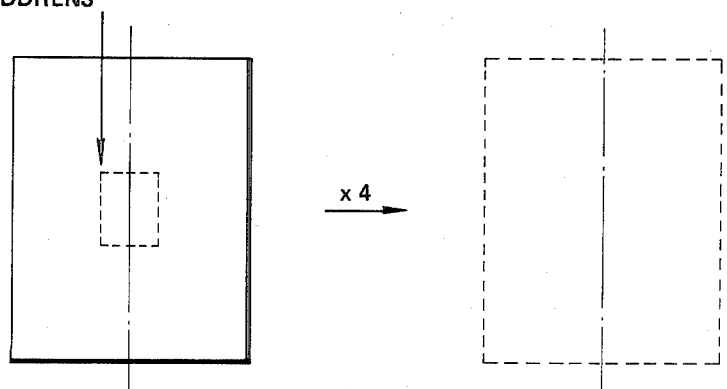
×4
FIG.19
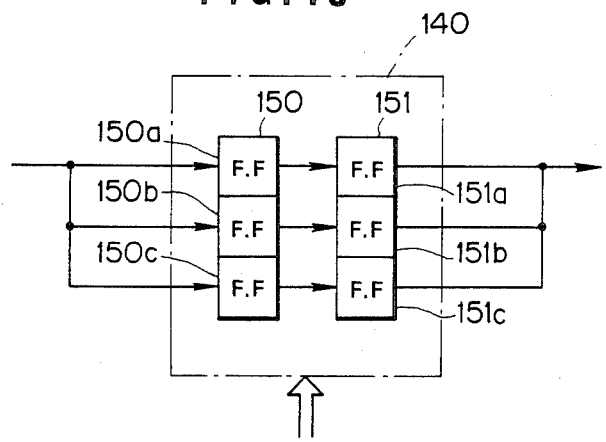

APPARATUS FOR MAGNIFYING OR REDUCING A COLOR IMAGE IN WHICH SEQUENTIALLY-STORED RGB DATA ARE SELECTIVELY READ OUT FROM A MEMORY IN ACCORDANCE WITH PREVIOUSLY-DETERMINED READ CONTROL DATA

BACKGROUND OF THE INVENTION

1. Field of the Invention

This invention relates to a color picture image forming apparatus in which an optically read manuscript picture image data is decomposed into plural types of color signals and a manuscript picture image is reproduced on a recording medium based on the decomposed manuscript picture image data, and more particularly to apparatus for reproducing a color picture image while enlarging or reducing the size thereof.

2. Description of the Prior Art

As a color image forming apparatus, an electrophotographic color copying device has been known in which a picture image is formed by forming an electrostatic latent image on a drum. In such an electrophotographic color copying apparatus, filters of three primary colors (cyan, magenta, yellow) are used to sequentially form electrostatic latent images of red, green and blue colors on the drum, the latent images are developed with tones of three colors and the developed image are sequentially transfer printed onto a printing paper thus reproducing a color picture image.

In such a copying apparatus, when the picture image is enlarged or reduced, a desired magnification or reduction is obtained by moving a lens system to a predetermined position corresponding to degree of the magnification or reduction. In this apparatus, there are such problems that it takes a certain time to move the lens system and that the magnification or reduction degree is fixed. Moreover, the prior art apparatus has a complicated construction and large dimensions.

In recent years, a thermal transfer printing type color copying apparatus has been proposed in which thermal transfer printing type ink ribbons of a plurality of colors are used to obtain color copies. Briefly stated, in such a copying apparatus, a manuscript is scanned with an optical system to read out the picture image information of the manuscript as color light signals, the read out picture image information are converted into color information corresponding to respective inks of the thermal transfer printing ink ribbons, and the color information of respective inks are temporarily stored in memory means. The color information thus stored is sequentially read out and inks corresponding to the thermal transfer printing ink ribbons corresponding to the read out color information are used for thermally transfer printing the inks onto the copying paper by using a heat sensitive head, thereby sequentially transfer printing respective colors onto the paper to obtain a color copy.

However, a copying machine of this type with an image enlarging or reducing function has not yet been realized. Thus, the copying machine of this type with adequate enlarging or reducing function has been desired.

SUMMARY OF THE INVENTION

It is therefore an object of this invention to provide a novel color picture image forming apparatus having a simple construction and capable of producing a multicolor picture image in a short time with any desired degree of multiplication or reduction.

According to this invention, there is provided color picture image forming apparatus comprising manuscript read means for optically scanning a manuscript picture image to form picture image data made up of plural types of different color signals; memory means for storing the picture image data outputted from the manuscript read means such that the color signals are repeated in a predetermined order according to a predetermined address order; color picture image recording means for forming a color picture image on a recording medium according to the picture image data outputted from the memory means; magnification/reduction degree setting means for setting magnification and reduction degrees necessary to enlarge or reduce the size of the color picture image; write control means for supplying a write address signal to the memory means to control writing of data into the memory means from the manuscript read means; and read control means for supplying a read address signal to the memory means to control reading of data from the memory means and supplying of the read out data to the picture image forming means the read control means including read address updating means for performing updating operation for read addresses including an operation of repeatedly outputting the same address or skipping some addresses according to degree of the magnification or reduction set in the magification/reduction degree setting means.

According to this invention, at the time of enlarging or reducing the size of the color picture image, it is not necessary to move an optical lens system as in the prior art apparatus, so that it is not only possible to decrease the size of the mechanism but also to eliminate a waiting time necessary for moving the lens system, thereby enabling to enlarge or reduce at a high speed a multicolor picture image.

BRIEF DESCRIPTION OF THE DRAWINGS

In the accompanying drawings:

FIGS. 8–10 show essential portions of the picture image forming unit in which FIG. 8 is a transverse sectional view, FIG. 9 is a perspective view, FIG. 10 is a transverse sectional view showing a state in which a ribbon cassette is removed;

FIG. 18 show states of setting a read out leading address;

FIG. 19 is a connection diagram showing one example of the inside construction of an order changing circuit;

DESCRIPTION OF THE PREFERRED EMBODIMENT

A preferred embodiment of this invention will now be described with reference to the accompanying drawings.

Figure 1:
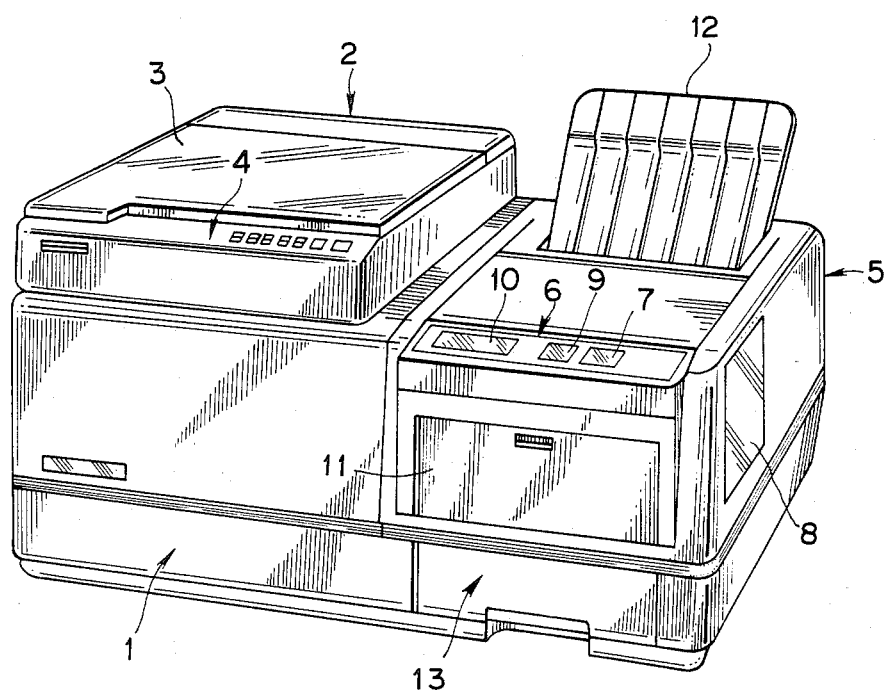
FIG. 1 is a perspective view showing the general construction of a picture image forming apparatus.

FIG. 1 shows an external view of a picture image forming apparatus. As shown, a picture image information read device 2 is removably mounted on the apparatus 1. A manuscript cover 3 is secured to the picture image information device free to open and close, and a manuscript support, not shown, made of a transparent glass plate is provided beneath the cover 3 for supporting a manuscript. The picture image information read device 2 is constructed to photoelectrically convert the information contained in the manuscript when the manuscript disposed on the manuscript support is optically scanned by reciprocating a scanner including an exposure optical system (to be described later) along the lower surface of the manuscript support. An operating panel 4 is provided on the surface of the picture image information read device 2. A signal converted by the picture image information read device 2 is supplied to a picture image forming unit 5 removably mounted on the righthand side of the apparatus 1. In the picture image forming unit 5, a picture image corresponding to the converted signal is formed on a copying paper. On the upper front surface of the picture image forming unit 5 is provided an operating panel 6 which comprises an on-line scanner key 7 which selects the picture image information read device 2, an ejector key 9 operated at the time of taking out a thermal transfer printing ribbon acting as a transfer printing medium through a door 8, and a display device 10. A guide member 11 free to open and close is provided on the front surface of the picture image forming unit 5 for inserting the copying paper with a hand and paper tray 12 for receiving a transfer printed copy paper is provided for the upper surface. A paper feed cassette 13 containing copying papers is detachably provided for the apparatus 1 beneath the picture image forming unit 5.

Figure 2:
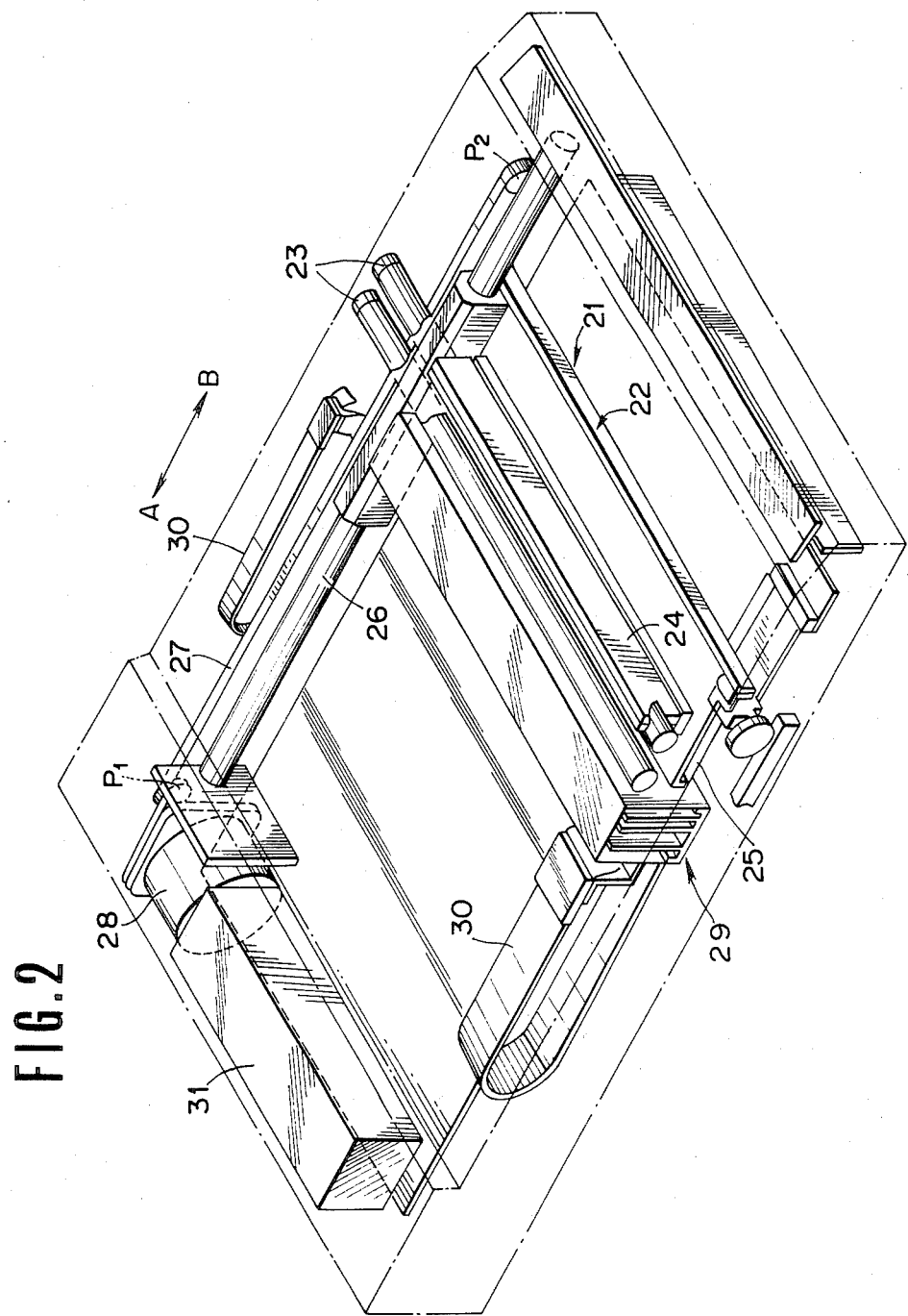
FIG. 2 is a perspective view showing essential parts of a picture image information reading device.

FIG. 2 shows the construction of the picture image information read device. As shown, two parallel lamps 23 are mounted on a carriage 22 comprising the scanner 21 and two lenses 24 which are arranged in an inverted V shape between the lamps 23. A photoelectric converter 25 comprising a color CCD is provided beneath the lenses 24. In this embodiment, the photoelectric converter 25 is a three primary color decomposing image sensor comprising 3 primary color filters of red (R), green (G) and blue (B) and three juxtaposed silicon photodiodes corresponding to respective filters. One end of a guide shaft 26 is slidably received in the carriage 22, and a so-called timing belt (toothed belt) 27 extending along the guide shaft 26 is also secured to the carriage 22. The timing belt 27 moves, under tension, about a pulley $P_1$ securing to the shaft of a pulse motor 28, and an idle pulley $P_2$ so that by the movement of the timing belt 27, the scanner 21 is moved in the direction of arrow A-B. Reference numeral 29 designates an A/D converter for converting the output signal of the photoelectric converter 25 into a digital signal, and 30 a bracket cable for supplying electric power outputted from an inverter 31 to the lamps 23 and for supplying the output signal of the A/D converter 29 to the picture image forming unit 5.

Figure 3:
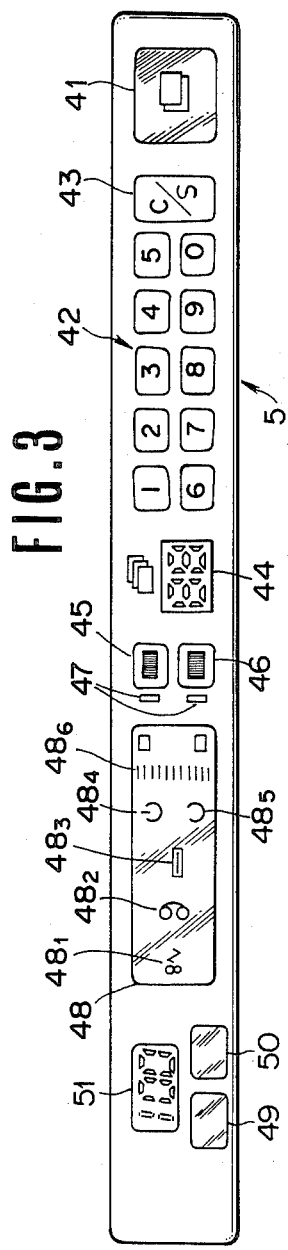
FIG. 3 is a plan view showing the construction of an operating panel.

FIG. 3 shows the operating panel 4 of the picture information read device 2. The operating panel 4 comprises a print key 41 for designating starting of printing operation, a ten key 42 for designating the number of prints, a clear stop key 43 for releasing the designation of the number of prints and for designating print stop, a set number display device 44 for displaying the number of prints, etc., an intermediate tone mode key 45 for designating an intermediate tone mode corresponding to a full colors and the concentration of the mode, a binary mode key 46 for designating a binary mode corresponding to a monocolor or seven colors, and the concentration of the mode, a mode display device 47 for displaying a set mode key, a display device 48 for providing various displays, magnification degree designating keys 49 and 50 for setting magnification and reduction degrees, and a display device 51 displaying a designated magnification degree. The display device 48 comprises a jam display device $48_1$ which is lighted when paper jam occurs, a ribbon display device $48_2$ for displaying various states, for example, that a ribbon cassette is not provided with a ribbon, and a state that no cassette is mounted, a paper display device $48_3$ for displaying the state of mounting the paper feed cassette or presence or absence of the paper, scanner display devices $48_4$ and $48_5$ for displaying the operating state of the scanner unit 21 and a concentration display device $48_6$ for displaying the concentration set by the operation of the mode keys 45 and 46.

Figure 4:
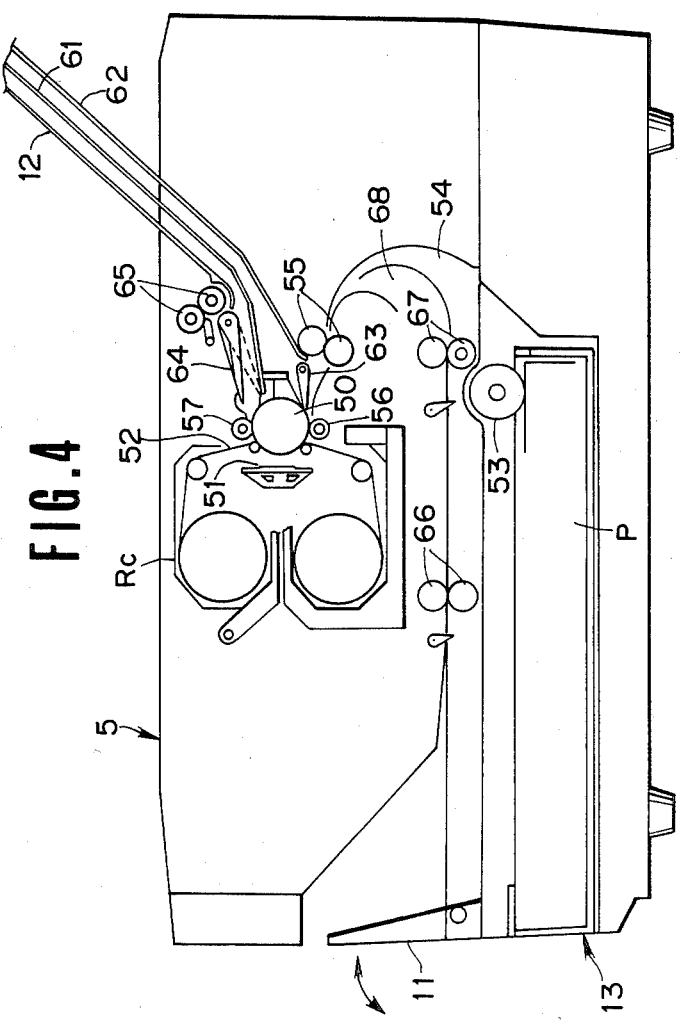
FIG. 4 is a transverse sectional view showing the construction of the picture image forming unit.

The picture image forming unit 5 has a construction as shown in FIG. 4. More particularly, a platen 50 is located at about the center of the picture image forming unit 5 and a thermal head 51 acting as the recording head is disposed in front of the platen 50 (on the left side as viewed in FIG. 4) to be movable toward and away from the platen 50.

The thermal head 51 is contained in a ribbon cassette Rc so that a thermal transfer printing ribbon 52 (ink ribbon) is interposed between the thermal head 51 and the platen 50. A copying paper P is urged against the platen 50 with the thermal transfer printing ribbon 52 interposed therebetween. Under this state, when a heat generating element (not shown) in the form of lines and dots of the thermal head 51 is caused to generate heat in accordance with the picture image information, the ink on the thermal transfer printing ribbon 52 is heat melted to be transfer printed on the copying paper P.

A paper feed roller 53 is installed beneath the platen 50 for taking out, one after one, copying papers P contained in the paper feed cassette 13. The copying papers thus taken out are guided to register rollers 55 disposed above the paper feed roller 53 through a paper guide 54, the register rollers aligning the leading edges of the copying papers P. Thereafter, the copying papers P are transferred to the platen 50 and wrapped about the same by push rollers 56 and 57 whereby the copying papers P are fed correctly.

Figure 5:
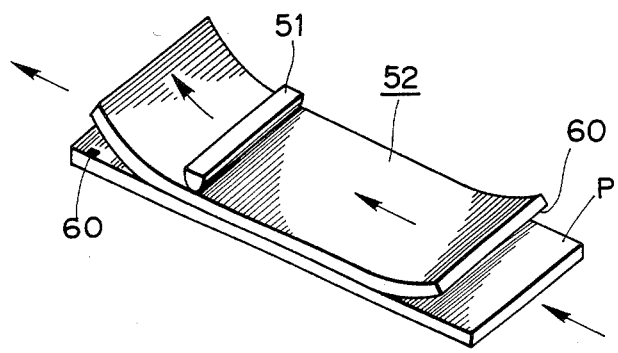
FIG. 5 is a perspective view for explaining the transfer printing operation.

The thermal head 51 urges the copying paper P against the platen 50 via the thermal transfer printing ribbon 52 so as to heat molten ink 60 on the thermal transfer printing ribbon 52 to transfer print the molten ink onto the copying paper P, as shown in FIG. 5.

Figure 6:
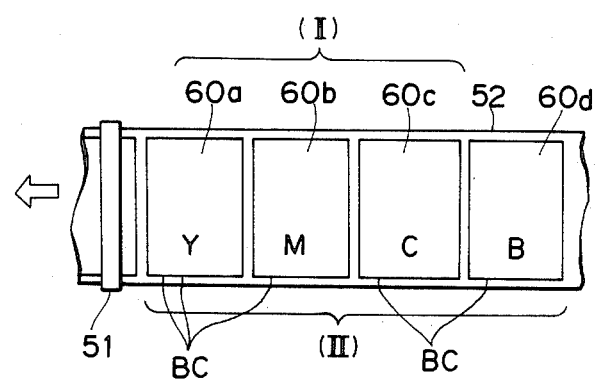
FIG. 6 is a plan view showing the state of applying inks to thermal transfer printing ribbons.

As shown by a range (I) in FIG. 6, the thermal transfer printing ribbon 52 has substantially the same size as the copying paper P and ink sections 60a, 60b and 60c of yellow (Y), magenta (M) and cyan (C) colors are juxtaposed, or as shown by range (II) ink sections 60a, 60b, 60c and 60d of yellow (Y), magenta (M), cyan (C) and black (B) colors are juxtaposed. In operation, one color is transfer printed, the copying paper P is returned to the original position, and successive colors are accurately superposed one after another.

At the side edges of respective ink sections 60a–60d of the heat transfer printing ribbon 52 are provided bar codes BC for identifying respective ink sections and for aligning the leading edges thereof with the leading edge of the copying paper P. These bar codes are read by a bar code sensor 78 to be described later with reference to FIG. 8.

When it is desired to obtain a clear black copy, a black color ink section 60d is added to the thermal transfer printing ribbon. However, even when the black color ink section is not added, color close to black color can be obtained by superposing three primary colors.

As the platen 50 rotates, the copying papers P are reciprocated by a number corresponding to the number of colors and the papers P are sequentially guided over first and second guide members 61 and 62 disposed along the lower surface of the paper discharge tray 12.

Figure 7A:
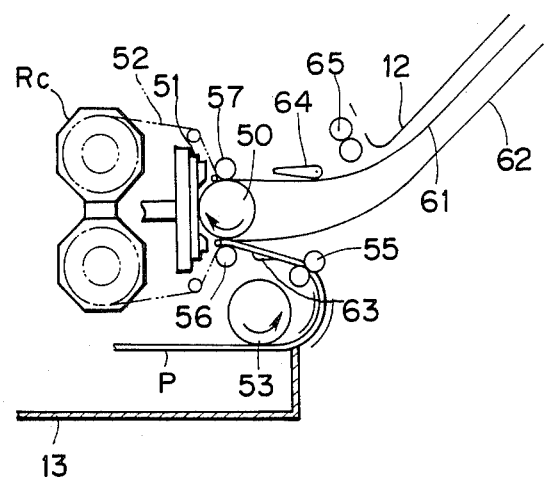
FIGS. 7a–7d are side views for explaining the movement of the copying paper at the time of multicolor transfer printing.

This operation will be described with reference to FIGS. 7a–7d. As shown in FIG. 7a, a copying paper P supplied from the paper feed cassette 13 is wrapped about the platen 50 after passing through register rollers 55 and a first distributing gate 63.

Then as the platen 50 is driven by a pulse motor not shown, the copying paper P is conveyed at a predetermined speed. At the same time, the heat generating element, not shown, of the thermal head 51, arranged in dots in line along the axial direction of the platen 50 is caused to generate heat in accordance with the picture image information whereby the inks 60 on the thermal transfer printing ribbon 52 are transfer printed onto the copying paper P.

Figure 7B:
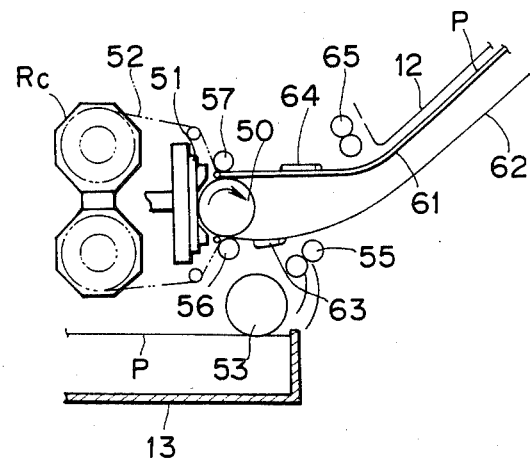

The leading edge of the copying paper P passed through the platen 50 is sent to a first guide member 61 extending along the lower surface of the paper discharge tray 12 by a second distributing gate 64, as shown in FIG. 7b.

Figure 7C:
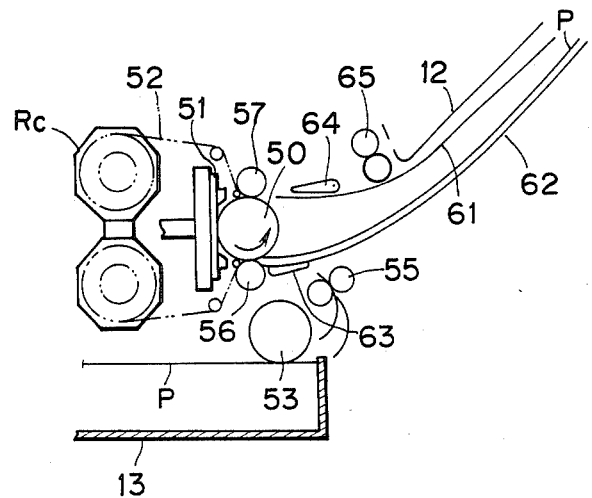

As the rotation of platen 50 is reversed, the copying paper P transfer printed with ink 60 of a given color is moved in the opposite direction, and by the rotation of the first distributing gate 63, the copying paper is conveyed onto the second guide member 62 extending along the lower surface of the first guide member 61, as shown in FIG. 7c.

In this manner, the copying paper P is reciprocated several times to obtain a multicolor copy.

Figure 7D:
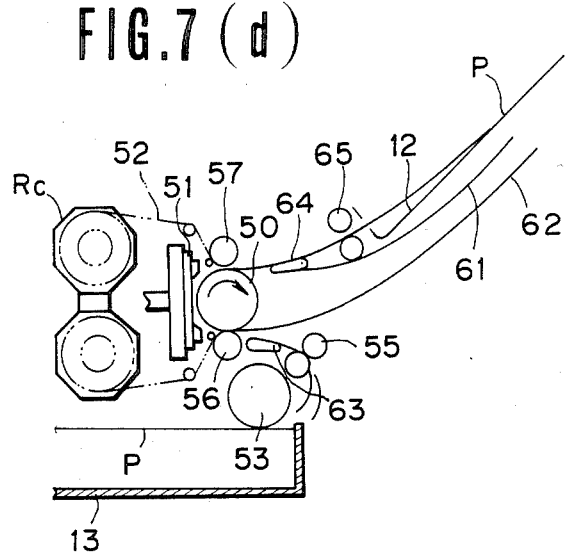

Finally, the copying paper P transfer printed with inks 60 of all colors is guided to the paper discharge rollers 65 by the second distributing gate 64 to be discharged on the paper discharge tray 12 as shown in FIG. 7d.

As shown in FIG. 4, pairs of rollers 66 and 67 are provided for the purpose of conveying the copying paper P inserted with a hand, and the copying paper conveyed by these rollers 66 and 67 is conveyed to the register roller 55 through a paper guide passage 68.

Figure 8:
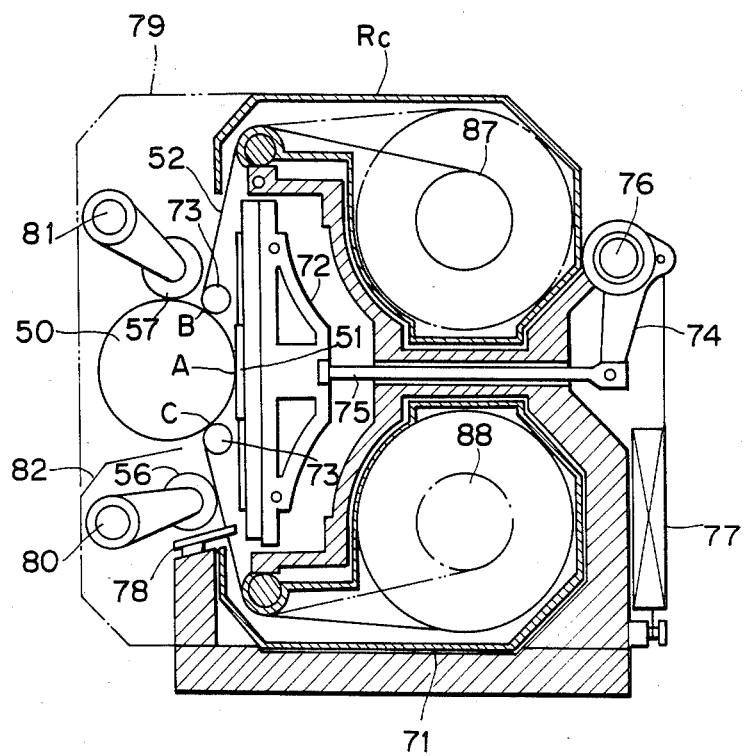
Figure 9:
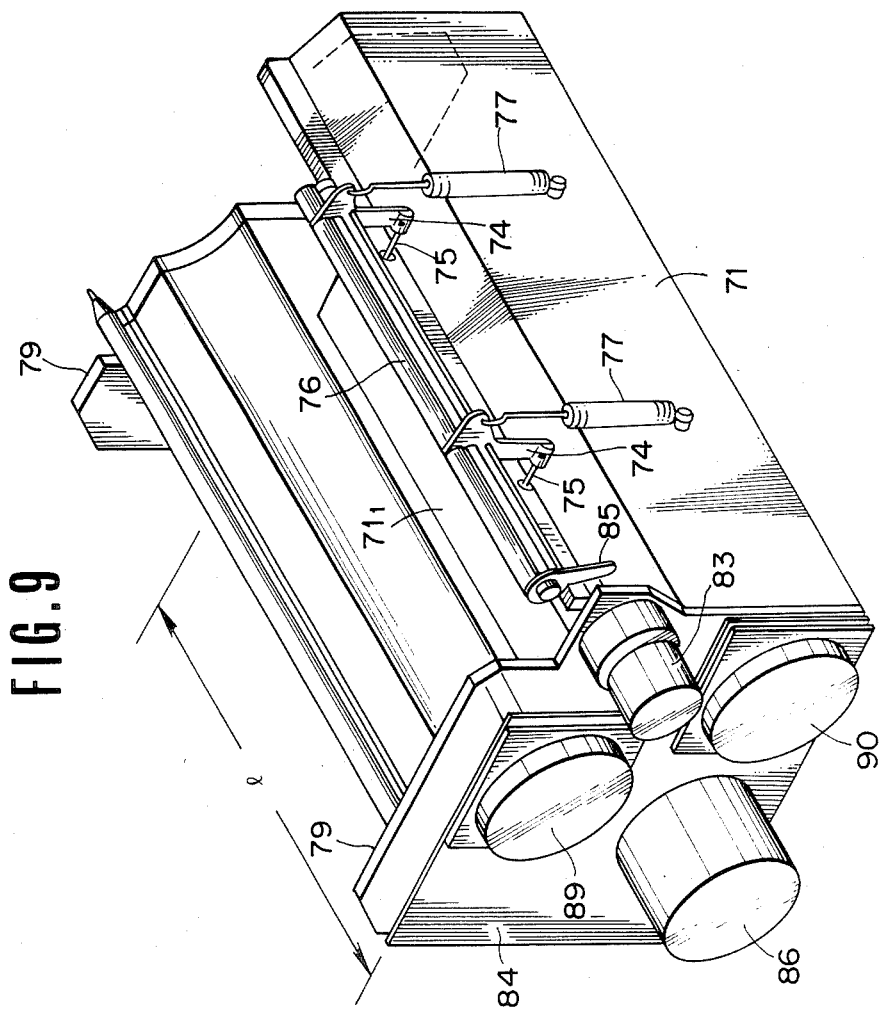
Figure 10:
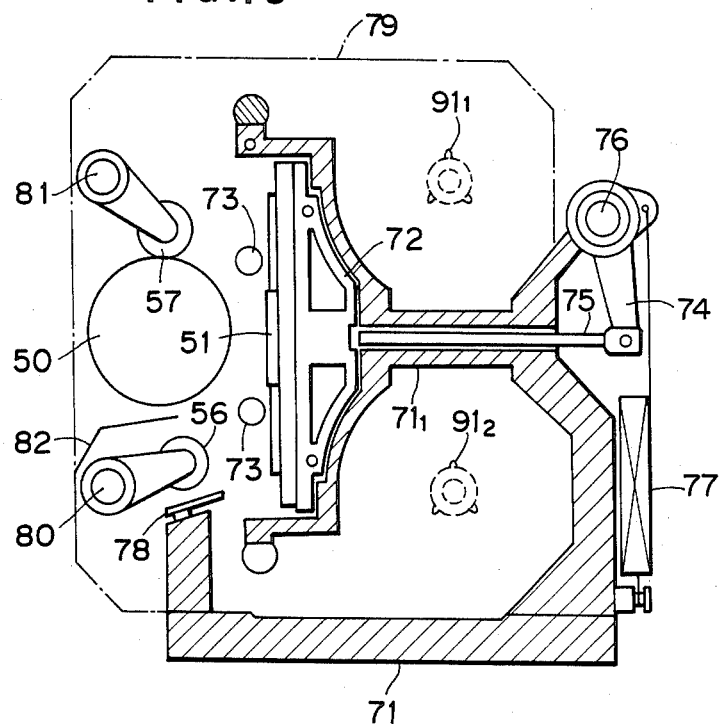

The construction of the picture image forming unit 5 will now be described with reference to FIGS. 8 through 10. As shown, a printer block 71 has substantially the samem contour as that of a ribbon cassette Rc. The block 71 supports the rear surface of the thermal head 51, a head holder 72 acting as a heat radiating plate, a member 73 integral with the head holder 72, a rod 75 with one end connected to the head holder 72 and the other end connected to the drive link 74, a pivot pin 76 of the link 74, a coil spring 77 urging the link 74 in one direction for moving the thermal head 51 toward the platen 50 through rod 75, and a bar code detector 78 including a luminous element and a light receiving element for detecting bar codes provided for the thermal transfer printing ink ribbon 52.

The platen 50 is supported by a frame 79 connected to both sides of the printing block 71, the frame 79 journalling the shafts 80 and 81 of pressure rollers 56 and 57 urging the copying paper P against the platen 50. The pressure rollers 56 and 57 are driven by solenoid coils, not shown.

Between the pressure roller 56 and the platen 50 is provided a paper guide 82. As shown in FIG. 9, the frame 79 is provided with a motor 83 for driving the thermal head 51 and a motor frame 84.

A cam mounted on the shaft, not shown, of the motor 83 is for rotating a lever 85 provided for the pivot pin 76 so as to move the thermal head 51 against the force of the coil spring 77. The motor frame 84 supports a platen driving motor 86 and ribbon driving motors 89 and 90 for driving cores 87 and 88 of the thermal transfer printing ink ribbon 52 contained in the ribbon cassette Rc. These motors 86, 89 and 90 drive the platen 50 and ribbon cores 87 and 88 through gears, not shown. As shown in FIG. 10, engaging projections $91_1$ and $91_2$ are provided for gears driving the cores 87 and 88. As a consequence, by controlling motors 89 and 90 the thermal transfer printing ribbon 52 is driven in the forward and reverse directions.

Figure 11:
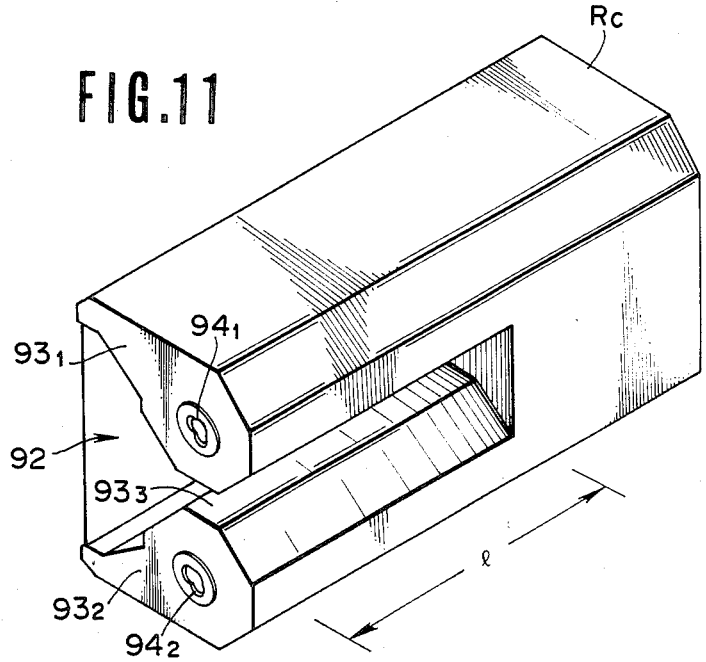
FIG. 11 is a perspective view showing the construction of the ribbon cassette.

The ribbon cassette Rc is removably mounted on the printer block 71. More particularly, as shown in FIG. 11, the ribbon cassette Rc has substantially C shaped crosssection which defines a space 92 for accommodating holder 72, member 73 and the thermal head 51 between the rear surface of the exposed portion of the thermal transfer printing ribbon 52 and the ribbon cassette Rc.

A slot $93_3$ is provided for the ribbon cassette Rc along the length thereof and between the core receivers $93_1$ and $93_2$ for receiving fit members $71_1$ (see FIGS. 9 and 10) of the printer block 71. The slot $93_3$ and the fit member $71_1$ have substantially the same length l which is longer than one half of the width of the thermal transfer printing ribbon 52. Accordingly, as the ribbon cassette Rc is moved longitudinally with respect to the printer block 71, the ribbon cassette can be mounted or dismounted from the printer block 71. The side surfaces of the core receivers $93_1$ and $93_2$ are provided with windows for exposing recesses 94₁ and 94₂ provided for cores 87 and 88 so that when the ribbon cassette Rc is mounted on the printer block 71, the engaging projections 91₁ and 91₂ are received in the recesses 94₁ and 94₂ respectively. When the thermal head 51 is moved toward the platen 50 while the ribbon cassette Rc is being mounted on the printer block 71, the thermal transfer printing ribbon 52 would be urged against platen 50 by member 73 as shown in FIG. 8. A copying paper, not shown, is interposed between platen 50 and thermal transfer printing ribbon 52 so that when the thermal head 51 generates heat in accordance with the picture image information, the ink of the ribbon 52 is melted and transfer printed on the copying paper.

Figure 12:
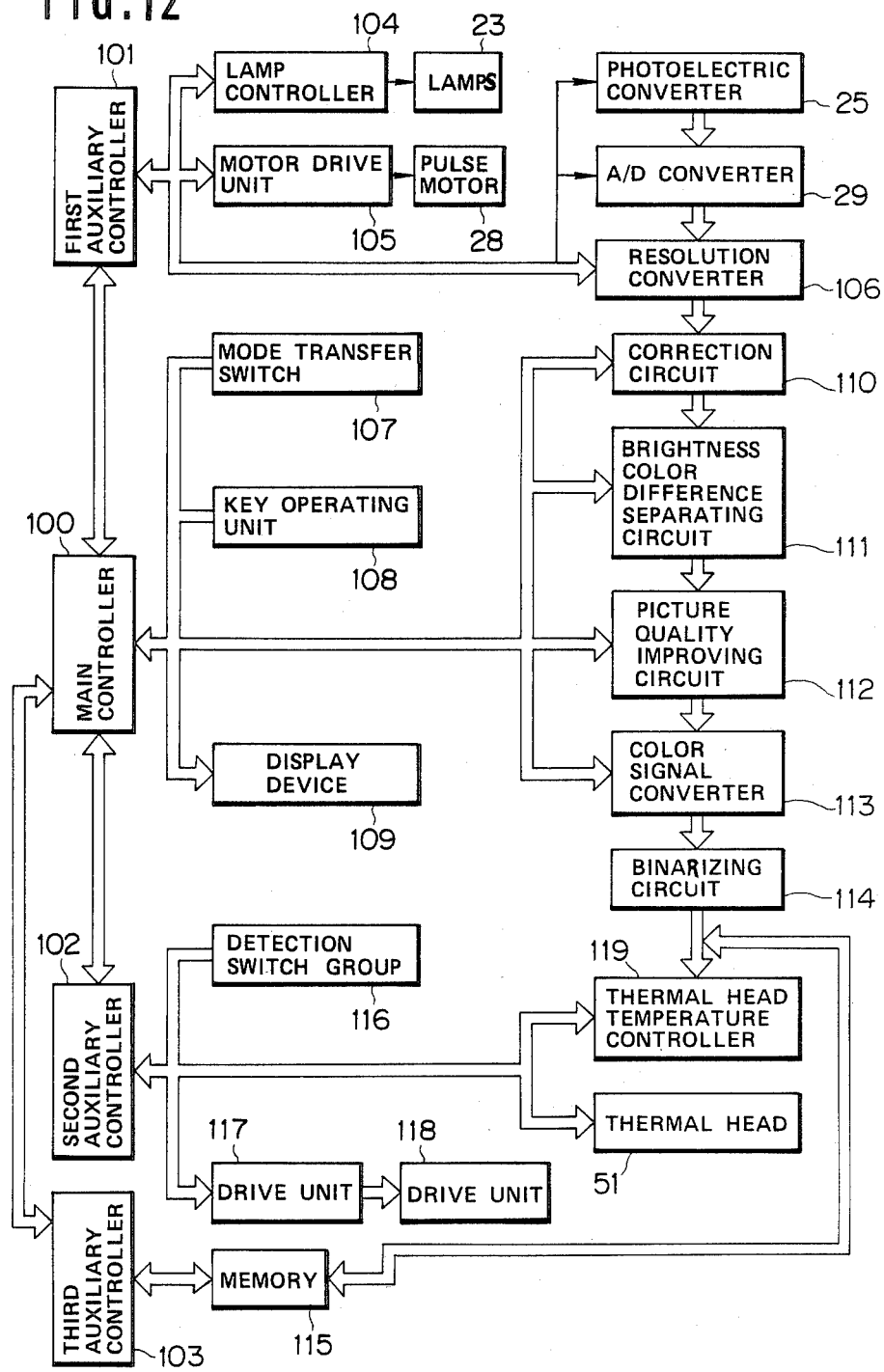
FIG. 12 is a block diagram showing the construction of a control system.

FIG. 12 is a block diagram showing a control system of the apparatus in which a main controller 100, first, second and third auxiliary controllers 101, 102 and 103 are respectively constituted by a microcomputer, for example. The purpose of the main controller 100 is to control the picture image forming apparatus, while first, second and third auxiliary controllers are controlled by the main controller 100. The first auxiliary controller 101 mainly controls the picture image information read device 2. To the first auxiliary controller 101 are connected the lamps 23 via a lamp controller 104, and the pulse motor 28 that drives the carriage 22 through a motor drive unit 105. Further, to the first auxiliary controller 101 are also connected the photoelectric converter 25 including filters of R, G and B colors, the A/D converter 29 and a resolution converter 106. The purpose of the resolution converter 106 is to convert the resolution of the photoelectric converter 25 into that of the thermal head 51 or to process color signals in accordance with degree of magnification or reduction. The detailed construction of the resolution converter 106 will be described later.

To the main controller 100 are connected a mode transfer switch 107 which adjusts the waveform distribution of the lamps 23 and changes the overall hue, a key operating unit 108 including an online scanner key 7, an ejector key 9, a print key 41, a ten key 42 and a clear stop key 43 which are mounted on the operating panels 4 and 6, and display unit 109 comprising display devices 10 and 48. To the main controller 100 are also connected a correction circuit 110, brightness-color difference separating circuit 111, a picture quality improving circuit 112, a color signal converter 113 and a binarizing circuit 114. The correction circuit 110 subjects the signal outputted from the resolution converter 106 to a so-called shading correction. The brightness-color difference separating circuit 111 separates a brightness signal and color difference signals from a signal subjected to the shading correction. The picture quality improving circuit 112 subjects the output signal from the brightness-color difference separating circuit to an edge emphasis and a γ correction. The color signal converting circuit 113 converts the optical color signal outputted from the picture quality improving circuit of ink color signals Y, M, C and B. The binarizing circuit 114 converts inputted signals into binary signals by using a dither matrix.

The third auxiliary controller 103 controls writing and reading of a memory device 115, which stores the transfer printing data outputted from the binarizing circuit 114 for respective ink color signals.

The principal purpose of the second auxiliary controller 102 is to control the picture image forming unit 5, and to the second auxiliary controller 102 are connected a detection switch group 116 detecting the operation states of various parts, a motor 86 for driving platen 50 through a drive unit 117, motors 89 and 90 for driving the thermal transfer printing ribbon 52, a motor for driving paper feed roller 53, register rollers 55, and paper discharge roller 65, and a drive system 118 including solenoid coils for driving first and second distributing gates 63 and 64. Further, to the second auxiliary controller 102 are connected a thermal head 51 and a thermal head temperature controller 119, which supplies the transfer printing data outputted from the binarizing circuit 114 or memory device 115 to the thermal head 51. The thermal head temperature controller 119 controls width of drive pulses for the thermal head in accordance with a signal supplied from the temperature detector, not shown, for the thermal head 51 so as to control the temperature of the thermal head 51 to an adequate level.

The essential part of this invention, that is the signal processing for enlarging and reducing the picture image will now be described. This signal processing is executed by the resolution converter 106.

Figure 13:
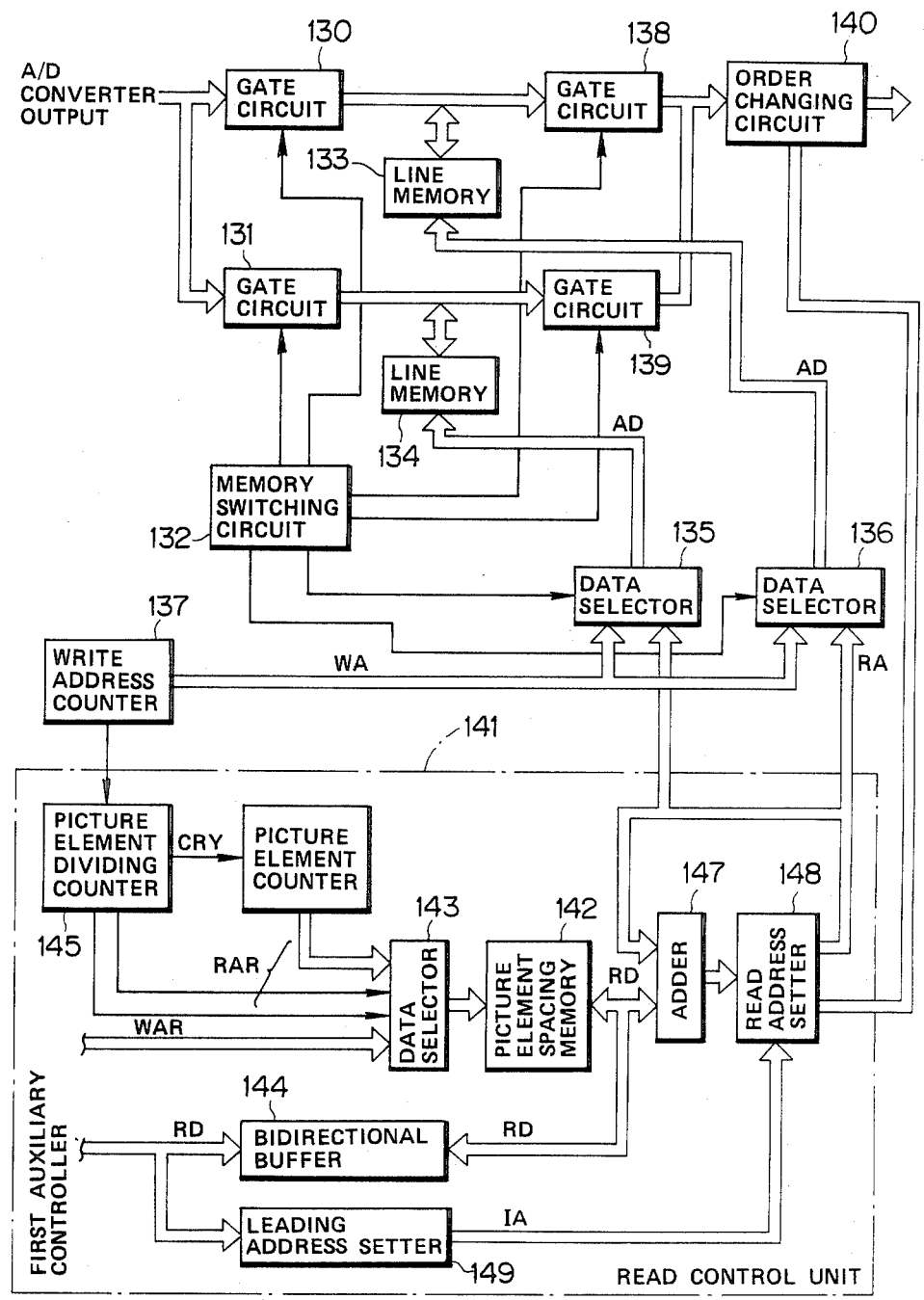
FIG. 13 is a block diagram showing a control circuit for enlarging and reducing a picture image.

FIG. 13 shows the construction of the resolution converter 106. The output signal of the A/D converter 29 shown in FIG. 12 is supplied to gate circuits 130, 131 according to the order of colors R, G, B, R, G and B. These gate circuits 130 and 131 are operated alternately in accordance with the output signal of the memory circuit 132 for alternately supplying the picture image signal from the A/D converter 29 to line memory devices 133 and 134. Each of the line memory devices is constituted by a random access memory device RAM capable of storing a multivalue digital signal of one line outputted from the A/D converter 29. The reading and writing operations of these line memory devices 133 and 134 are controlled by an address data supplied from data selectors 135 and 136 alternately operated by the output signal of the memory switching circuit 132. More particularly, to write the output signal of the A/D converter into the line memory devices 133 and 134, the address signal WA outputted from a write address counter 137 selects line memory device 133 or 134 and an address of the selected memory device is designated. To read out a signal from the line memory device 133 or 134, the address is designated by a read address information RA outputted from a read address setter 148. The signals read out from the line memory devices 133 and 134 are supplied to an order change circuit 140 via gate curcuits 138 and 139 alternatively operated by the output signals from the memory switching circuit 132.

The read controller 141 will now be described. In this controller, prior to the read operation of the line memory device 133 or 134, a read control data RD from the first auxiliary controller 101 is written in a picture element spacing memory device 142 constituted by a RAM, for example. The read control data RD is formed by a predetermined program set by the first auxiliary controller 101, one example of the program being shown in FIG. 14.

Figure 14:
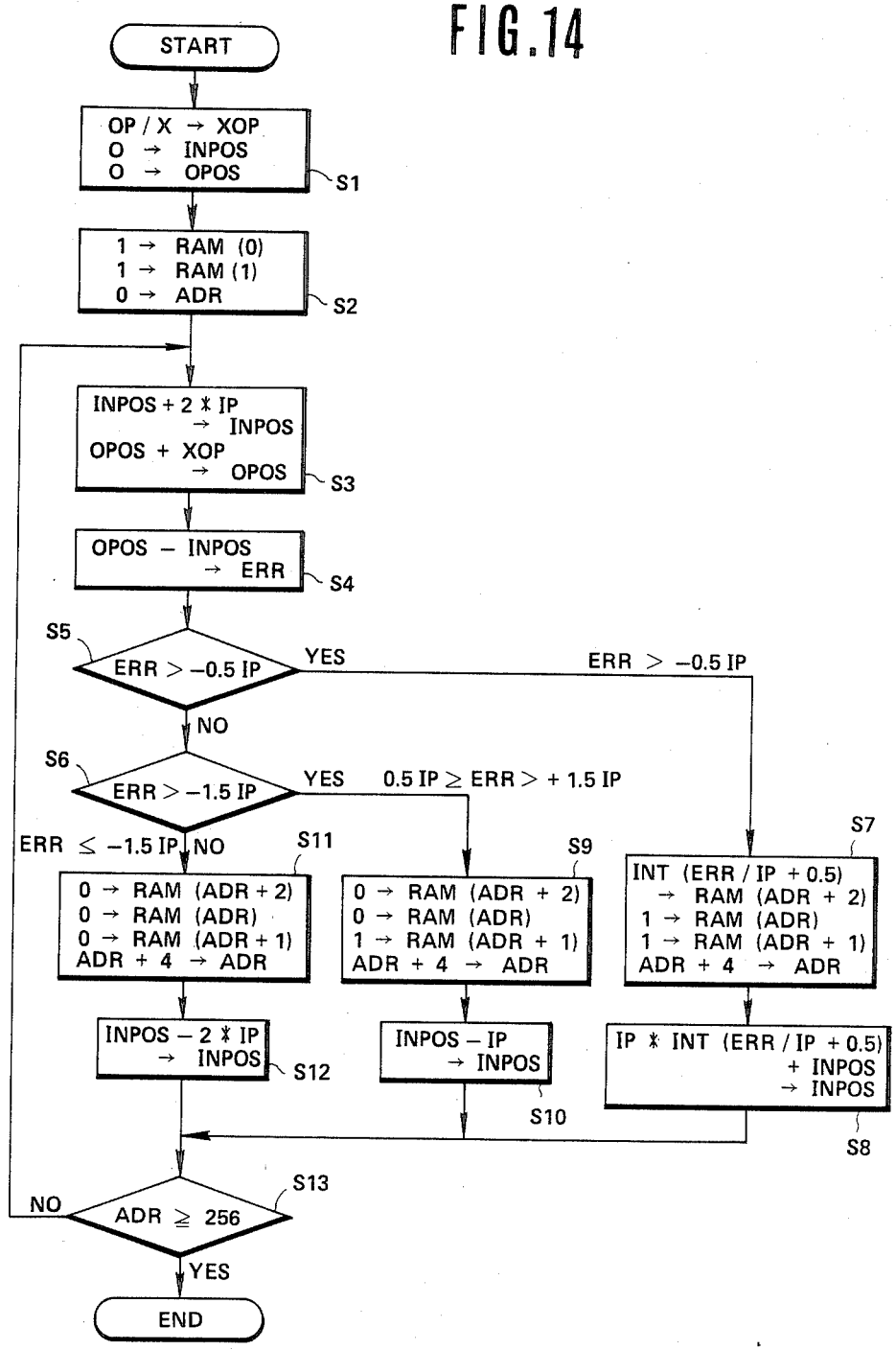
FIG. 14 is a flow chart useful to explain the forming operation of read out control data.

In FIG. 14, at steps S1 and S2, memory areas XOP, INPOS, OPOS, RAM and ADR are initialized, in which OP represents the pitch of the output picture element (see FIG. 15) of the thermal head 51, and X represents magnification or reduction degree designated by a magnification degree designation keys 49 and 50 on the operating panel. Consequently, a value OP/X obtained by dividing the pitch OP of the output picture element of the thermal head 51 by the magnification/reduction degree X is stored in the memory area XOP.

Figures 15, 16:
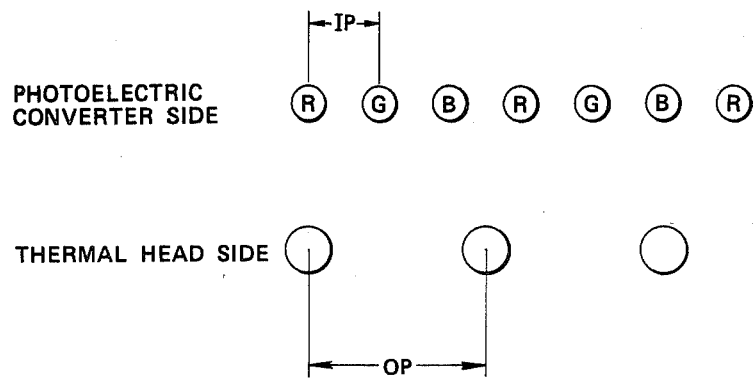
FIG. 15 is a diagram for explaining pitch of a read picture element of a photoelectric converter, and pitch of the recorded picture element of a thermal head.
FIG. 16 is a graph showing the memory state of memory areas of a RAM.

IP shows the pitch of the read picture elements (see FIG. 15) for each filter (R.G.B.) in the photoelectric converter 25. Therefore, IP×3 shows the pitch of one picture element at the time of reading. RAM represents an area into which read control data RD calculated by the arithmetic processing to be described later is stored. Control data RD is written in the memory area RAM as shown in FIG. 16. Thus, data RD is written in the areas of addresses 4n, 4n+1 and 4n+2, but RD are not written in the areas of the address 4n+3. In this case, the RAM has a capacity of storing 256 read control data RD. As shown in FIG. 16, ADR is a value representing the leading address each time R,G,B unit is written. Accordingly, for example, 1→RAM(0) means that data "1" is written in the 0th address of the RAM, and 0→RAM (ADR+2) means that data "0" is written in the (ADR+2)th address of the RAM.

INPOS has a value defined by the following equation:

INPOS=INPOS (previous value)+2*IP  (1)

OPOS has a value defined by the following equation:

$$OPOS = OPOS \text{ (previous value)} + XOP \quad (2)$$

By the initialization executed at steps S1 and S2, OP/X is written in area XOP, 0 is written in INPOS, 0 is written in OPOS, 1 is written in RAM(0), 1 is written in RAM(1) and 0 is written in ADR.

Then at step S3, (INPOS+2*IP) is written in area INPOS and (OPOS+XOP) is written in area OPOS. At the initial stage, since INPOS=0 and OPOS=0, it becomes that INPOS=2IP and OPOS=XOP.

Then at step S4, the difference between OPOS and INPOS that is ERR (=OPOS−INPOS) is determined and the value of the read control data RD of the R,G,B unit is determined.

Figure 17A:
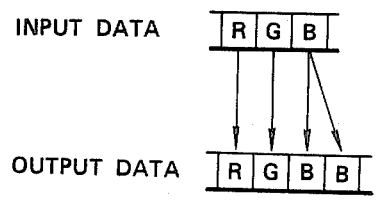
FIGS. 17a-17f show signal processing contents effected by control data.

After that, at steps S5 and S6, the error ERR thus determined is compared with the pitch IP of respective color filters to judge the magnitude of the error and the result of judgment is used to determine which one of the processings, step S7→Step S8, step S9→step S10 and step S11→step S12 should be executed.

Where the error ERR is larger than −0.5IP, the processing of step S7 is executed. When the result K of the arithmetic operation of INT {(ERR/IP)+0.5} is zero, 0 is stored in RAM (ADR+2) while 1 is stored in RAM (ADR) and RAM (ADR+1) respectively. Among the read control data RD stored in the RAM, "0" means that the read addresses of the line memory devices 133 and 134 are not advanced, and "1" means that read addresses of the line memory devices 133 and 134 are advanced and, consequently in this case the relation between the input data and the output data is shown by FIG. 17a meaning that four output data are produced by three input data.

When the result K of the arithmetic operation is 1, "1" is stored in areas RAM (ADR+2), RAM (ADR) and RAM (ADR+1) respectively.

Figure 17B:
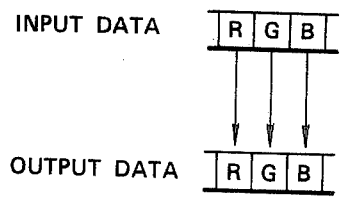
Figure 17C:
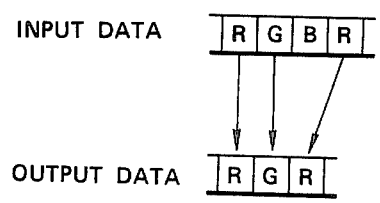
Figure 17D:
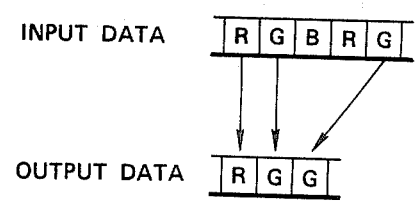

In this case, the relation between the input data and the output data is shown by FIG. 17b meaning that three output data are formed from three input data.

Where the result K of the arithmetic operation is 2 or larger, K (2 of larger) is written in RAM (ADR+2), and "1" is written is RAM (ADR) and RAM (ADR+1). As the read addresses of the line memory devices are advanced in accordance with the memory content of the RAM, (K-1) color signals stored in the line memory devices 133 and 134 are skipped so that the number of the output data becomes smaller than the number of the input data. This arithmetic operation route is utilized for the reducing processing of the picture image. For example, where the result K of the arithmetic operation becomes '2', the relation between the input data and the output data would be shown by FIG. 17c, whereas when the result is '3', the relation would be shown by FIG. 17d.

After completion of the processing of writing the result of the arithmetic operation, at step S7, 4 is added to the leading data address thereby updating it. The reason of adding 4 lies in that the memory area of address (n+3) of RAM is vacant as shown in FIG. 16.

Then at step S8, the INPOS is corrected according to the following process:

INPOS←IP*INT (ERR/IP+0.5)+INPOS

Figure 17E:
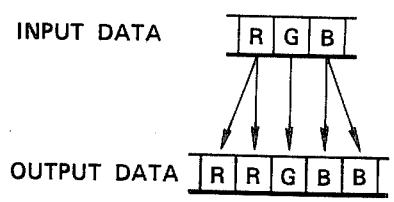

At step S6, where the value of error ERR is larger than −1.5IP, that is where −1.5IP<ERR≦0.5IP, at step S9, "0" is stored in RAM (ADR+2) and RAM (ADR) and "1" is stored in RAM (ADR+1). In this case, the relation between the input data and the output data would be shown by FIG. 17e meaning that 5 output data are formed from 3 input data. After that at step S10, INPOS is corrected according to the following process.

INPOS←INPOS−IP

Figure 17F:
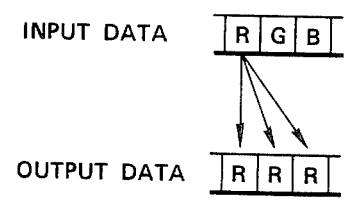

At step S6, where it is judged that error ERR is smaller than or equal to −1.5IP, at step S11, "0" is stored respectively in RAM (ADR+2), RAM (ADR) and RAM (ADR+1). Accordingly, in this case the relation between the input data and the output data would be shown by FIG. 17f meaning that three output data are formed from one input data. After that, at step S12 INPOS is corrected as follows.

INPOS←INPOS−2*IP

As described above, according to the value of error ERR, color signal read control data are stored in the memory area of RAM. When INPOS is corrected at steps S8, S10 and S12 respectively, the program is advanced to stop S13 at which a judgment is made as to whether all data have been written in the memory area RAM according to the content of ADR. If the result of judgment is NO, the program is returned to step S3 for updating INPOS and OPOS. At step S4, the error ERR between the updated OPOS and INPOS is determined again for executing either one of the processings S7→S8, S9→S10 and S11→S12 in accordance with the error ERR. More particularly, by repeating such processing, processings of S7→S8, S9→S10, S11→S12 are combined so that read control data RD corresponding to a magnification/reduction degree X set thereby are sequentially stored in the memory area of RAM.

At step S13, when writing of data in the memory area of the RAM has been completed, the content of the RAM is written into the picture element spacing memory device 142. More particularly, during this writing operation, the write address WAR of the picture element spacing memory device 142 are supplied from the first auxiliary controller 101 to the picture element spacing memory device via the data selector 143 shown in FIG. 13, while at the same time read control data RD stored in the RAM is supplied from the first auxiliary controller 101 to the picture element spacing memory device 142 via a bidirectional buffer memory 144. As described above, the read control data RD stored in the picture element spacing memory device 142 are sequentially read out by the read address signal RAR supplied via data selector 143. The read address signal RAR is formed by a picture element dividing counter 145 and a picture element number counter 146. More particularly, the picture element dividing counter 145 outputs a signal representing the division (IP unit) of the read pitch of 3 types of the filter unit by counting the number of output signals of the write address counter 137 so as to output 0, 1, 2, 0, 1, 2, ... that is the counts of a three step counter. The carry signal CRY of the picture element dividing counter 142 is applied to a picture element number counter 146 which is a 64 step counter for counting the number of the carry signals CRY. Thus, the output of the picture element counter 146 is updated to the picture element unit, that is, three IP units, and the counted output is supplied to the data selector 143.

In this manner, the count signal supplied to the data selector 143 from the picture element dividing counter 145 and the picture element number counter 146 is utilized as the read address signal RAR of the picture element spacing memory device 142 and in accordance with the read address signal RAR, the read control data RD stored in the picture element spacing memory device 142 are sequentially read out. The read control data RD read out from the picture element spacing memory device 142 is supplied to one input terminal of an adder 147. To the other input terminal of the adder 147 is fed back an output of a read address setter 148 constituted by a plurality of flip-flop circuits, for example.

Each time a signal corresponding to one line is read out from the line memory devices 133 and 134, read leading address IA is inputted to the line memory devices 133 and 134 from a leading address setter 149. This is because, the region to be processed (shown by broken lines) in the manuscript picture image differs depending upon the magnifying power set, as shown in FIG. 18, where a picture image is to be enlarged or reduced, the leading address IA is calculated based on the magnification or reduction degree set by the first auxiliary controller 101.

Each time the leading address IA thus calculated reads out a signal of one line from the line memory devices 133 and 134, the signal is inputted to the read address setter 148 via a leading address setter 149. Accordingly, adder 147 adds together the leading address IA set in the read address setter 148 and the read control data RD read out from the picture element spacing memory device 142, so as to rewrite the set content of the read address setter 148 in accordance with the output of the adder. Further, the adder 147 adds together the output of the rewritten read address setter 148 and the read control data RD read out next time from the picture element spacing memory device 142, and these addition operations are repeated. As a consequence, where the read control data is 0, the read addess signal RA outputted from the read address setter 148 will not be changed, but in the other case, that is when the read address control data is larger than 1, the read address signal will be increased by a number corresponding to the read control data.

The read address signal RA thus formed is supplied to either one of the line memory devices 133 and 134 via data selectors 135 and 136 alternately operated by the memory switching circuit 132 and the line memory devices 133 and 134 output color signals of corresponding addresses. The read out color signals are supplied to the order change circuit 140 via gate circuits 138 and 139. As shown in FIG. 19 the order change circuit 140 is constituted by an order changing flip-flop circuit group 150 and an output buffering flip-flop circuit group 151. The color signal outputted from the line memory 133 or 134 is held by a predetermined one of the flip-flop circuits 150a, 150b and 150c by discrete clock signals inputted from the read address setter 148.

More particularly, the flip-flop circuit 150a holds a picture image data corresponding to a color signal R, for example, the flip-flop circuit 150b holds a picture image data corresponding to a color signal G, and the flip-flop circuit 150c holds a picture image data corresponding to a color signal B. Thus, the flip-flop circuits 150a, 150b and 150c are inputted with picture image data of predetermined preset colors.

Thereafter, the color signal which has been held by the flip-flop circuit group 150 is transferred to one of the flip-flop circuits 151a, 151b and 151c of the flip-flop circuit group 151.

These flip-flop circuits 151a, 151b and 151c are inputted with discrete output control signals. In response to the output control signals, the flip-flop circuit group 151 outputs picture image data of a predetermined color order R, G, B, R, G, B, for example, and these picture image data are supplied to the correction circuit 110. Although color image data are inputted at a random color order to the order changing circuit 140 from the line memory device, the color order of the picture image data are changed in the order change circuit 140 so that this circuit outputs picture image data of a predetermined order, for example R,G,B, R,G,B ....

Thereafter, the above described operations are performed to form a color picture image of a desired magnification.

Figure 20:
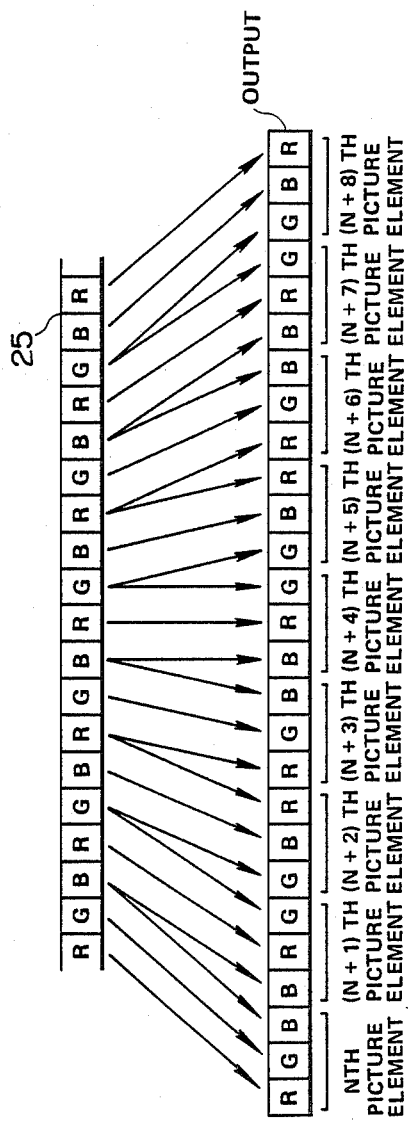
FIG. 20 shows one example of an enlarging processing of a picture image.

With the apparatus described above where it is desired to enlarge the picture image, a signal processing, for example, as shown in FIG. 20 is executed.

In FIG. 20, among 3 color signals R,G,B comprising one picture element and produced by photoelectric converter 25, 1-3 color signals are used repeatedly according to the set magnification degree to constitute adjacent picture elements.

Figure 21:
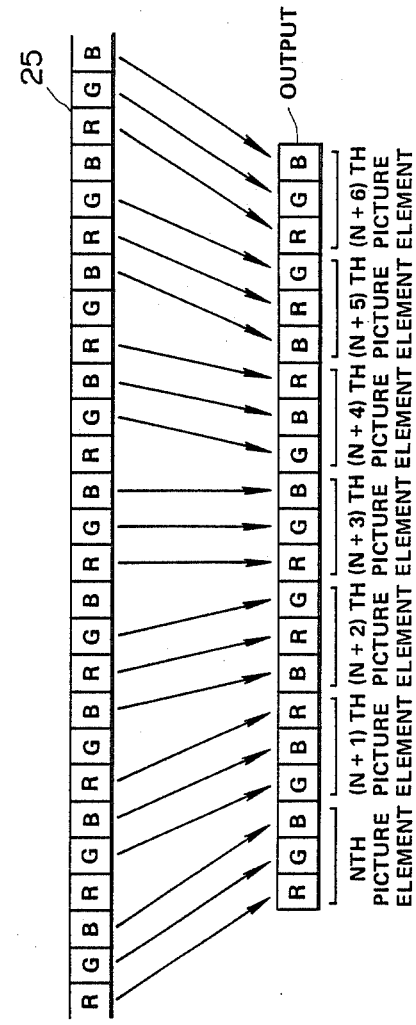
FIG. 21 shows one example of a reducing processing of a picture image.

To form a reduced size picture image, an operation, for example, as shown in FIG. 21 is performed. More particularly, among three color signals R,G,B produced from the photoelectric converter and constituting one picture element, at least one color signal is skipped.

Although in the foregoing embodiment, the read leading addresses of the line memory devices 133 and 134 were set in accordance with a desired magnification degree, by arbitrarily setting these addresses, the picture image can be enlarged at any position of the main scanning direction (the direction of the array of CCD's constituting the photoelectric converter).

It should be understood that various changes and modifications will be obvious to one skilled in the art without departing from the true spirit and scope of the invention as defined in the appended claims. For example, the present invention can be applied to other type of the photoelectric converter and the picture image forming apparatus.

What is claimed is:

1. A color picture apparatus comprising:
reading means having a number of reading elements for optically scanning a color picture image to form picture image data, each of said picture image data comprising a plurality of distinct color data, each of said plurality of distinct color data representing a different color;
memory means for storing said color data formed by said reading means, with each of said color data being stored in a distinct address of said memory means;
magnification/reduction degree setting means for setting a magnification or reduction degree necessary to enlarge or reduce the size of said color picture image;
write control means for supplying a write address to said memory means to control writing of said color data formed by said reading means into said memory means such that said color data are stored in a predetermined sequence of addresses of said memory means; and
read control means for supplying a read address to said memory means to selectively control reading of each individual one of said color data from said memory means, said read control means comprising read address updating means for performing updating operations on said read address supplied to said memory means including an operation of repeating the same read address or an operation of supplying a read address representing the skipping of skipping at least one address of said memory means according to the magnification or reduction degree, respectively, set by said magnification/reduction degree setting means.

2. The apparatus according to claim 1 wherein said read control means further comprises read starting address setting means for setting a read starting address at which said read control means is to start to read said color data from said memory means and read control data forming means for forming and successively outputting read control data including data indicating that the same read address is to be repeated or data indicating that at least one address of said memory means is to be skipped in accordance with the magnification or reduction degree, respectively, set by said magnification/reduction degree setting means.

3. The apparatus according to claim 2 wherein said read starting address setting means sets said read starting address in accordance with said set magnification or reduction degree.

4. The apparatus according to claim 2 wherein said read address updating means comprises accumulating means for successively adding said read control data successively outputted by said read control data forming means to said set read starting address, an output of said accumulating means being supplied to said memory means as said read address.

5. The apparatus according to claim 2 further comprising color picture image recording means responsive to said color data stored in said memory means for recording a color picture image on a recording medium according to said color data, and wherein said read control data forming means forms said read control data based on said set magnification or reduction degree, a pitch between said reading elements of said reading means and a pitch between recording elements of said color picture image recording means.

6. The apparatus according to claim 5 wherein said read control data forming means comprises:
first means for storing said read control data,
second means for successively determining a difference between a first value updated according to said reading element pitch of said reading means and a second value updated according to a value obtained by dividing said recording element pitch of said color picture image recording means by said set magnification or reduction degree, and
third means for successively selecting one read control data from a plurality of possible read control data based on the difference successively determined by said second means and for successively storing said selected read control data in said first means.

7. The apparatus according to claim 1 wherein said memory means comprises line memory means capable of storing color data for at least one line of the color picture image.

8. The apparatus according to claim 7 wherein said line memory means comprises two line memories which are alternately operated.

9. The apparatus according to claim 1 further comprising color picture image recording means responsive to said color data stored in said memory means for recording a color picture image on a recording medium according to said picture image data, and wherein said color picture image recording means includes a printing ink ribbon having a plurality of different-colored thermally-transferrable inks, said inks being thermally transferred onto said recording medium in accordance with said color data.

10. The apparatus according to claim 1 further comprising color data order changing means for changing the order of the color data read out from said memory means by said read control means into a predetermined order.

11. A color picture appartus comprising:
reading means having a number of reading elements for optically scanning a color picture image to form picture image data, each of said picture image data comprising a plurality of distinct color data, each of said plurality of distinct color data representing a different color;
memory means for storing said color data formed by said reading means, with each of said color data being stored in a distinct address of said memory means;
color picture image recording means responsive to said color data stored in said memory means for recording a color picture image on a recording medium according to said color data;
magnification/reduction degree setting means for setting a magnification or reduction degree necessary to enlarge or reduce the size of said color picture image;
write control means for supplying a write address to said memory means to control writing of said color data said reading means into said memory means such that said color data are stored in a predetermined sequence of addresses of said memory means; and
read control means for supplying a read address to said memory means to selectively control reading of each individual one of said color data from said memory means, said read control means comprising read address updating means for performing updating operations on said read address supplied to said memory means including an operation of repeating the same read address or an operation of supplying a read address representing the skipping of at least one address of said memory means according to the magnification or reduction degree, respectively, set by said magnification/reduction degree setting means.

* * * * *